United States Patent [19]

Loomis et al.

[11] Patent Number: 5,563,607
[45] Date of Patent: Oct. 8, 1996

[54] TIME AND/OR LOCATION TAGGING OF AN EVENT

[75] Inventors: Peter Van Wyck Loomis, Sunnyvale; James E. Jones, Jr., San Jose, both of Calif.

[73] Assignee: Trimble Navigation Limited, Sunnyvale, Calif.

[21] Appl. No.: 249,432

[22] Filed: May 26, 1994

[51] Int. Cl.$^6$ ..................................... G01S 5/02
[52] U.S. Cl. ........................... 342/357; 364/449
[58] Field of Search .................... 342/357, 457; 364/449, 460

[56] References Cited

U.S. PATENT DOCUMENTS

| | | | |
|---|---|---|---|
| 5,345,244 | 9/1994 | Gildea et al. | 342/357 |
| 5,361,212 | 11/1994 | Class et al. | 364/428 |
| 5,379,045 | 9/1995 | Gilbert et al. | 342/357 |
| 5,379,224 | 1/1995 | Brown et al. | 364/445 |
| 5,420,592 | 5/1995 | Johnson | 342/357 |
| 5,434,789 | 7/1995 | Fraker et al. | 364/460 |
| 5,438,771 | 8/1995 | Sahm et al. | 37/448 |

Primary Examiner—Thomas H. Tarcza
Assistant Examiner—Dao L. Phan
Attorney, Agent, or Firm—Bruce D. Riter

[57] ABSTRACT

A differential GPS system for precise time and/or location tagging of an event. Reference and rover units cooperate to compensate for delayed availability at the rover unit of error-correction data transmitted via a two-way, high-latency communication link. A reference unit calculates and stores error-correction data. A rover unit collects and stores uncorrected GPS fix data, and transmits a message demanding error-correction data. The message preferably includes a time stamp indicating the time for which the error-correction data is to be valid. In reply to a demand message from a rover unit, the reference unit retrieves stored error-correction data and transmits it to the rover unit via the high-latency communication link. The reference unit includes a time stamp indicating the valid time of the error correction data if the valid time is not implicit in the reply. The rover unit uses the stored, uncorrected GPS fix data and the received error-correction data to compute a differentially-corrected GPS fix.

21 Claims, 6 Drawing Sheets

TIME AND/OR LOCATION TAGGING OF AN EVENT

BACKGROUND OF THE INVENTION

1. Field of the Invention

The invention relates to methods and apparatus for precise time and/or location tagging of an event, and particularly for determining time and location of an event with DGPS accuracy using a high-latency communication channel.

2. The Prior Art

Figure 1:
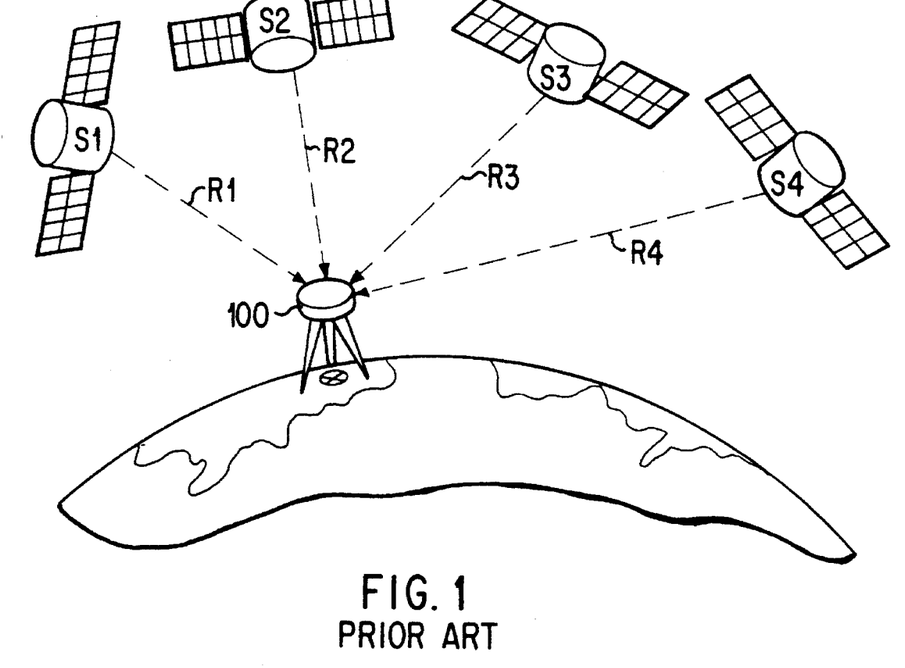
FIG. 1 illustrates prior-art GPS operation.

FIG. 1 illustrates a conventional global positioning system (GPS) arrangement. A GPS receiver 100 receives encoded signals from satellites S1, S2, S3, and S4. Receiver 100 includes a clock which determines a pseudo-range to each satellite by comparing a locally-generated code with a code contained in the satellite signal to determine the arrival time of the signal. Receiver 100 records pseudo-ranges R1, R2, R3, and R4 from their respective satellites. Inaccuracy of the clock in receiver 100 used to time the signal arrivals results in an unknown error in the pseudo-range measurements. Receiver 100 computes from the four pseudo-range measurements its longitude, latitude and altitude from the earth's center and its receiver clock error. The computed clock error is used to synchronize the receiver clock with the synchronized atomic clocks of the satellites. The computation gives receiver position to within about 15 meters and time to within 100 ns. Sources of measurement error include satellite clock errors, satellite orbital ephemeris errors, atmospheric delays in the ionosphere and troposphere, receiver noise, and multipath (signal reflections). With these errors, accuracies on the order of 15 meters are achievable. With "Selective Availability" (SA) in effect, an intentional error of greater magnitude is introduced by the U.S. Department of Defense (DoD) so the position solutions computed by a stationary receiver wander within a circle of 100 meter radius. Better accuracy is required for many applications. Differential GPS (DGPS) can be used to counteract most of these errors. Accuracies on the order of few meters are possible with DGPS, some units even achieving accuracies to 1 centimeter.

Figure 2:
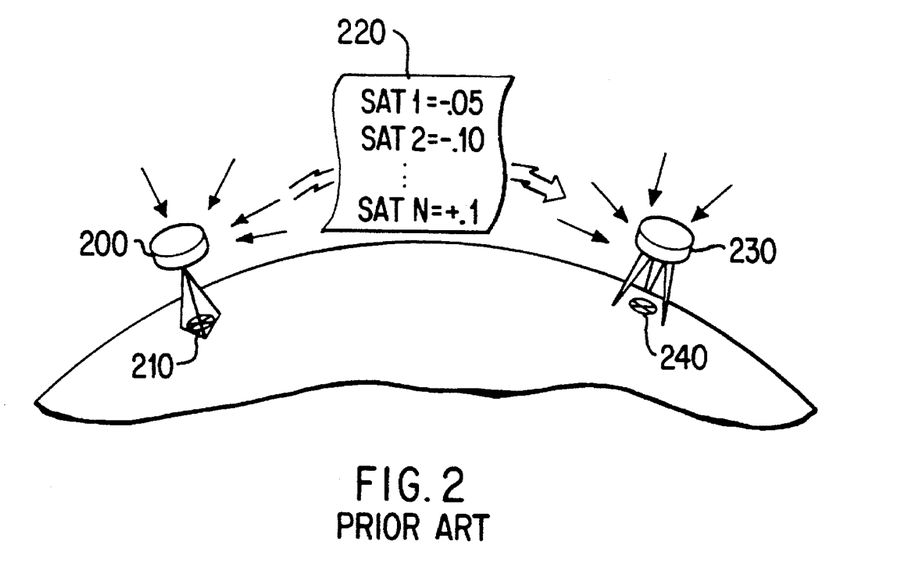
FIG. 2 illustrates prior-art local-area DGPS operation.

FIG. 2 illustrates a typical local-area DGPS installation. A reference DGPS receiver unit 200 is accurately placed at a known location 210. Receiver unit 200 acts as a static reference, computing and transmitting error corrections to other GPS receivers in the area. For example, an error message is transmitted as shown at 220 to a roving GPS receiver 230 at a location 240. The error message can take a variety of forms. The main technique is for the error message to be sent by telemetry. Roving receivers (such as receiver 230) process the error correction message and the received satellite signals to compute a position solution of enhanced accuracy In computing the error corrections, the reference receiver uses its known position and the known locations of the satellites to compute a theoretical arrival time. The difference between the computed theoretical time and the actual transmission time is the error (or delay).

The roving receivers continually receive a complete list of errors for all satellites and apply the corrections for the particular satellites they are using. The error correction messages are typically transmitted by a one-way radio link. Each of the roving GPS units is equipped with a radio receiver to receive and decode the corrections for use in computing a corrected position fix. See, for example, E. BLACKWELL, *Overview of Differential GPS Methods*, NAVIGATION, Vol. 32, No. 2, 1985, pp. 114–125.

Figure 3:
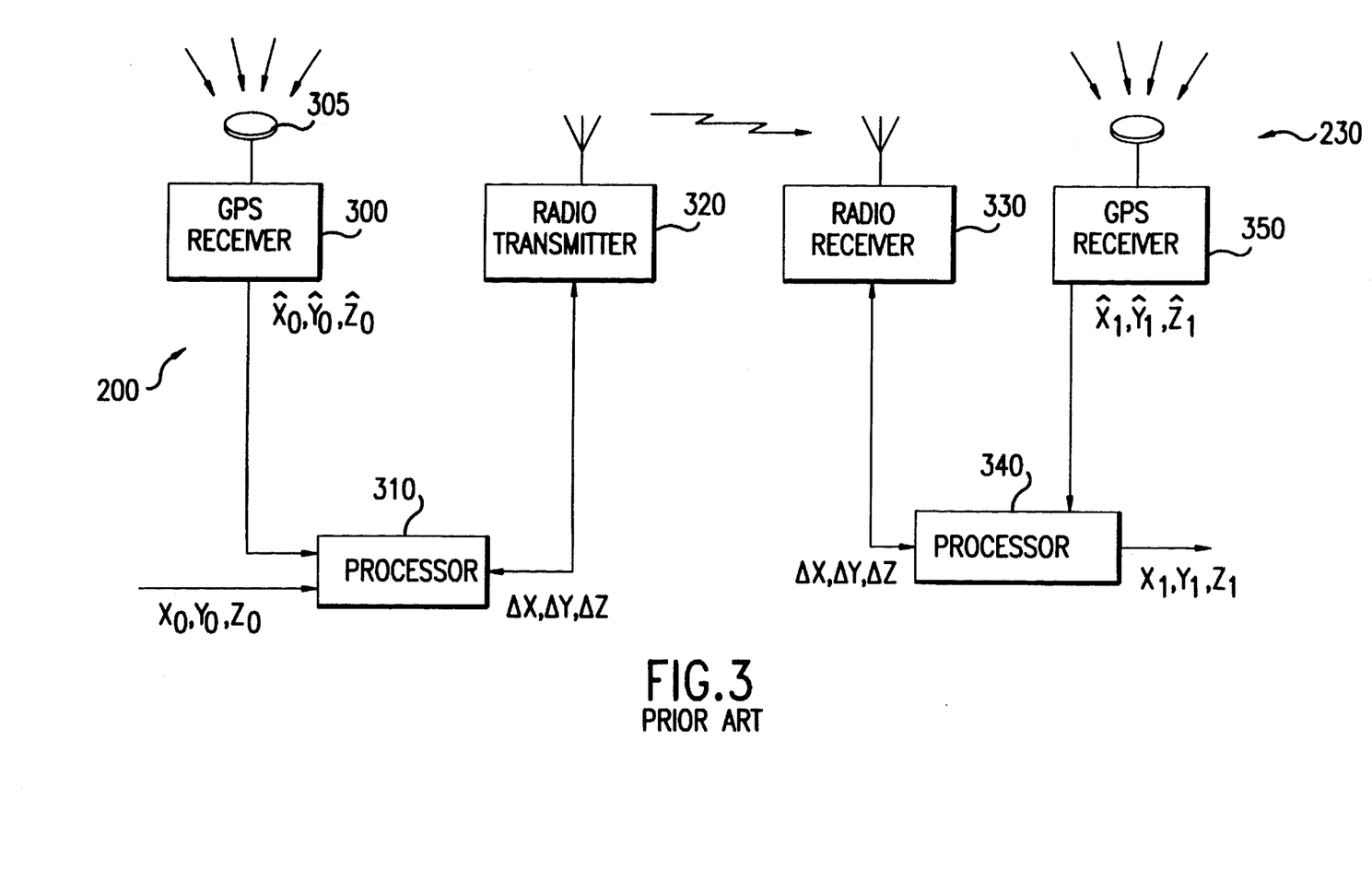
FIG. 3 is a block diagram of a prior-art local-area DGPS system.

FIG. 3 shows a prior art local-area DGPS arrangement. Reference unit 200 comprises a GPS receiver 300, a processor 310, and a radio transmitter 320. Receiver 300 computes a position solution $\hat{X}_0$, $\hat{Y}_0$, $\hat{Z}_0$ from received satellite signals. The location of antenna 305 is accurately surveyed and known to be at location $X_0$, $Y_0$, $Z_0$. Processor 310 uses the computed position solution from receiver 300 and the known location data to compute an error signal which is broadcast by radio transmitter 320 to all rover units in the area. Each rover unit 230 has a radio receiver 330 which supplies the error signal to processor 340. GPS receiver 350 computes a position solution from the received satellite signals, and processor 340 computes a corrected solution. The reference unit of a local-area DGPS system develops a scalar correction for each satellite pseudorange, which means that it does not try to break the observed error into components. The validity of the correction is reduced with increasing distance between the reference unit and a rover unit (spatial decorrelation). A local-area DGPS system thus serves a relatively small area of 500–800 km radius. Also known are wide-area DGPS systems in which a network of reference stations is used to develop vector corrections for each satellite in view. These systems estimate separately the error components due to satellite ephemeris, satellite clock and atmospheric delay. Wide-area DGPS is effective because the error components have differing decorrelation distances and times. A wide-area DGPS data stream can serve an entire continent. See U.S. Pat. No. 5,155,490 to Spradley, Jr. et al. for an example of a GPS system using a network of fixed stations to compute error-correction data. See also P. GALYEAN, *The Acc-Q-Point DGPS System*, PROC. ION GPS-93, Salt Lake City, 22–24 Sep. 93, pp. 1273–1283.

Figure 4:
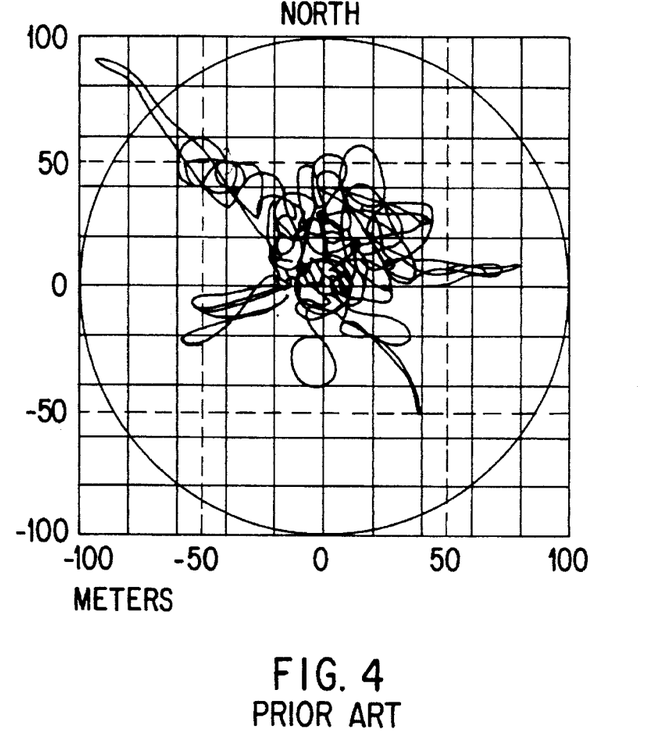
FIG. 4 is a plot of GPS position measurements over time with SA in effect.
Figure 5:
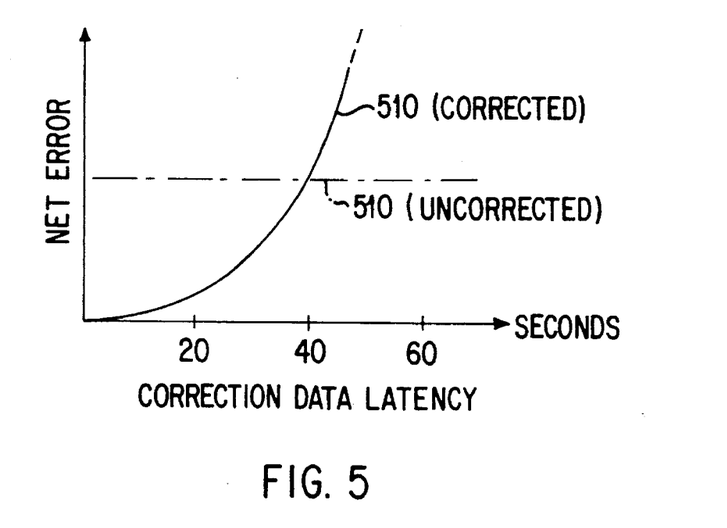
FIG. 5 illustrates the effect of latency of GPS error correction.

With either type of DGPS, timeliness of error-correction data is critical. As shown in FIG. 4, position solutions over time of a stationary GPS receiver with SA in effect wander within a radius of about 100 m due to the SA dynamic of 1 cm/sec with an acceleration of 1 cm/sec$^2$ (approximately 1 mG). Some time is required to compute the error-correction data, and additional time is needed to transmit the error-correction message. The sum of these times is called the "latency." FIG. 5 shows the effect of error-correction data latency. Dashed lined 500 shows the net error with uncorrected GPS. Curve 510 (not to scale) shows the net error for a "corrected" DGPS position fix. The error of the DGPS fix is substantially less than an uncorrected fix if the correction data is less than 15–20 seconds old, is still beneficial up to about 30–40 seconds and has the effect of increasing net error if more than 40 seconds old.

A radio link is adequate for transmitting DGPS error signals in many applications, such as in a harbor for use by ships. Some links operate at transmission rates low enough to require more than 10 seconds to transmit the corrections for all the visible satellites. Experience shows that an update rate of once every five seconds is much better, especially with SA in effect.

Some jobs do not require "real time" corrections, such as surveying or cartography. In these situations, the roving receiver records each measured position and the exact time it made the measurement. This data is later merged with the corrections recorded at the reference receiver for a final "clean-up" of the data. This is sometimes called "postprocessed" DGPS.

Another variation is "inverted" DGPS, which can be useful in fleet management. Each vehicle of a fleet reports its position periodically to a base station where the position fixes are corrected. The position fix at each vehicle is only known to "raw" GPS accuracy, but the base (reference) station can pinpoint the location of each vehicle with DGPS accuracy. An example of an inverted DGPS system is described in U.S. Pat. No. 5,223,844, in which a cellular telephone link is used to transmit uncorrected GPS. See also International Patent Publication No. WO-89/12835, published 28 Dec. 1989, which discloses a vehicle locating system having a navigation unit, microcomputer, and cellular telephone mounted on the vehicle and interconnected so that a central station can monitor the location of the vehicle by receiving position information from the navigation unit via the cellular telephone link.

To summarize, a roving receiver can compute its location to within 100 meters with SA in effect or to within about 30 meters without SA. A rover unit which can obtain error correction signals with a latency less than about 30–40 seconds can compute its position with greater accuracy than uncorrected GPS, though a latency of less than about 20 seconds is preferred for best accuracy. Post-processed GPS provides optimum accuracy, but the corrected fixes are not available until raw fixes are merged (later, and back at a home base) with the correction data; the rover knows its position only to "raw" GPS accuracy. Inverted DGPS likewise has the disadvantage that the rover can compute its position only to "raw" GPS accuracy because it does not have the error correction data.

Those systems which allow the roving unit to differentially correct its GPS position fixes, such as harbor navigation systems for ships, depend on the availability of a communication link having minimum latency to transmit the error correction data to the roving unit. Such communication links are unavailable in many locations, such as outside the operating range of cellular telephone transmitters and away from harbors or other populated areas having DGPS transmitter beacons.

Some users require DGPS accuracy in remote locations accessible only by satellite relay link. Examples include placement of wireless network repeaters, asset tagging, and precise mapping of the fringe-reception areas of cellular networks, time and location tagging of instrument readings, etc. It is therefore desired to provide a system in which a roving GPS receiver can obtain and make effective use of error correction data from a reference station via a communication link having a significant delay, e.g., a delay which renders the error correction data so stale as to be otherwise unusable.

SUMMARY OF THE INVENTION

The present invention provides methods and apparatus in which error correction data rendered stale by transport delay can be used to obtain optimum DGPS position fixes. When a corrected GPS fix is required at a roving unit (rover), the rover stores uncorrected fix data and time of fix, and transmits a demand for error correction data to a reference station via a high-latency communication channel. The demand preferably includes a time stamp indicating the time of fix. The base station replies with error-correction data valid at the time of fix. The rover uses the received error-correction data to compute a differentially-corrected fix. Correction-data transport delays are thus compensated in a near real-time manner, avoiding most of the delay of post-processed DGPS and avoiding the disadvantage of inverse DGPS that the corrected fix is known at the base station rather than at the rover. These and other features of the invention will be apparent to those of skill in the art from the detailed description given below and the accompanying drawing figures.

DETAILED DESCRIPTION

Figure 6:
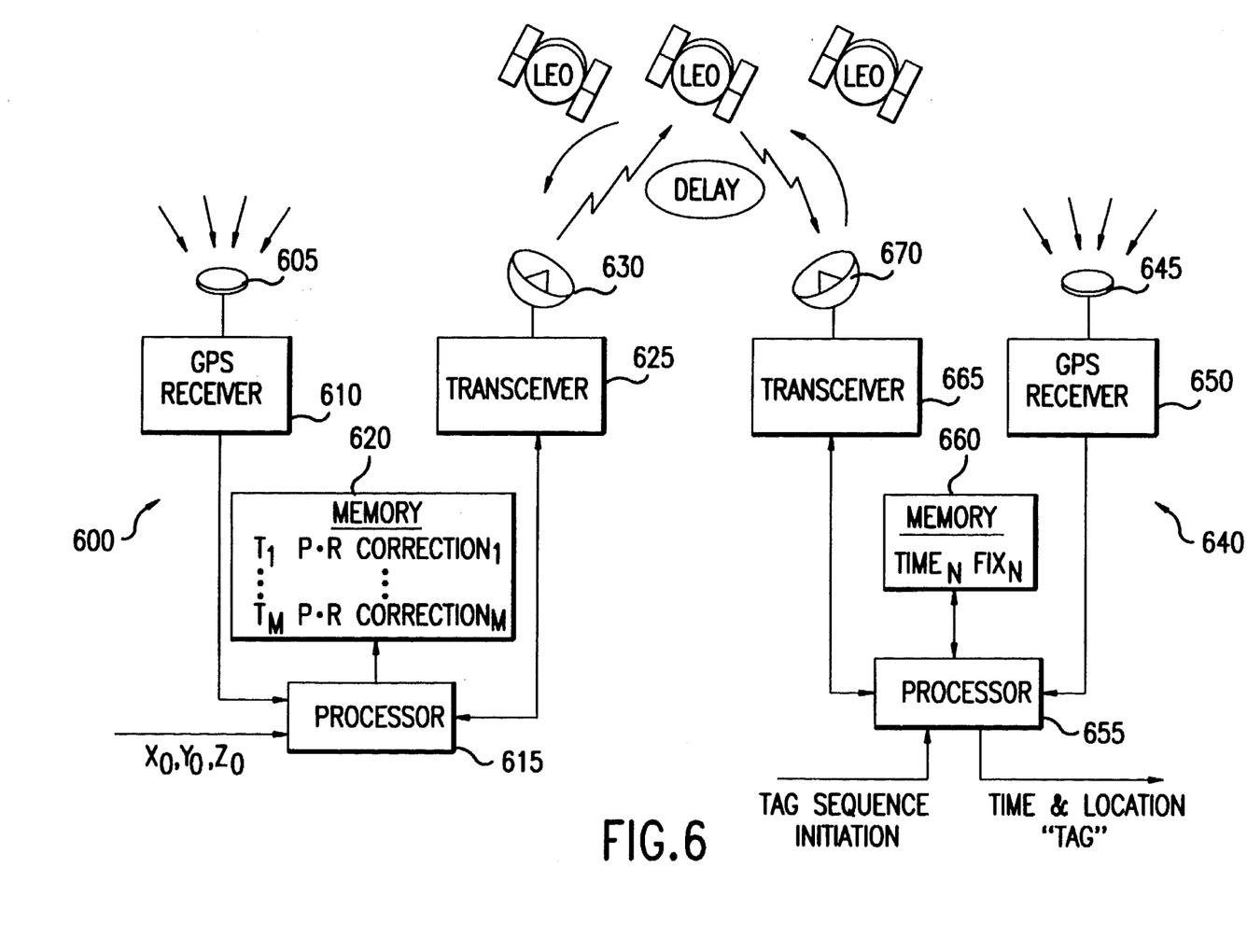
FIG. 6 shows a DGPS system modified in accordance with the invention.

FIG. 6 shows a modified DGPS arrangement in which a reference unit 600 at a known location $X_0$, $Y_0$, $Z_0$ includes a GPS antenna 605, a GPS receiver 610, a processor 615, a memory 620, and a satellite-link transceiver 625 with an antenna 630. A roving unit (rover) 640 has a GPS antenna 645, a GPS receiver 650, a processor 655, a memory 660, and a satellite-link transceiver 665 with an antenna 670. Rover 640 communicates with reference unit 600 via a two-way communication link having a latency greater than is acceptable for conventional DGPS position fix correction. The satellite link can, for example, be one which employs a constellation of low earth orbit (LEO) satellites. Such a constellation is currently being launched by Orbital Communications Corporation (Orbcomm). Orbcomm will offer a service employing VHF hand-held data transceivers which can be fed with data from a keypad or a data port for world-wide, two-way exchange of short digital burst packets. See, for example, R. KELLY, *Use of Low Earth Orbit Satellite Technology in the Development of a Unique Communications and Marine Positioning System*, PROC. ION GPS-93, Salt Lake City, 22–24 Sep. 1993, Vol. 1, pp. 199–204. The Orbcomm system will have near-realtime capability whenever a satellite has a simultaneous view of both a subscriber communicator's transceiver and an Orbcomm gateway Earth station. At other times, the Orbcomm system will employ a store-and-forward capability, holding the message at the satellite until it can be delivered. The one-way transmission channel delay using such a system can range from a few seconds to a few minutes, long enough for error-correction data to become unusable for realtime corrections.

In the arrangement of FIG. 6, rover unit 600 receives GPS signals from a plurality of GPS satellites, computes an uncorrected ("raw") GPS fix, and stores the raw fix and a "time stamp"—the time of the raw fix—in memory 655. Rover unit 600 then transmits to reference unit 600 a demand for error correction data over the LEO satellite link. The demand preferably includes the time stamp but may include any other suitable indication of the time of fix, as well as an identification of the rover arid an approximate position of the rover if not already known at the reference station.

Reference unit 600 continuously receives GPS signals, periodically computing error correction data and storing in a memory 620 the error correction data along with a "time stamp"—the time at which the GPS signals used to prepare the correction data were received. For example, at each time (such as time $T_1$) an error-correction data set (such as P-R Correction$_1$) is stored for later retrieval. When reference unit 600 receives a demand for error correction data valid at a particular time, it retrieves the correction data for that time from its memory and transmits it to the rover in a reply message which the rover will understand to contain error correction data valid at the time indicated by the time stamp. The error-correction data can be taken, for example, at intervals of 5–15 seconds. If desired, processor 615 can use known techniques to interpolate between data sets contained in memory 620 to prepare error-correction data valid at precisely the time indicated by the time stamp of the demand. Perfect time-correlation between the fix data and the error-correction data can thus be achieved. When rover 640 receives the error-correction reply message, it matches the error-correction data with a stored, "raw" GPS fix and computes a corrected fix for that time.

It can be seen that, by using a time stamp and storing the data temporarily at the rover until the appropriate correction data is obtained, the problem of error-correction latency is avoided and optimal DGPS position fixes are obtained at the rover in near realtime. Using a LEO satellite link to transmit error-correction data on demand adds only a brief delay to the operation, while giving DGPS accuracies as good as can be obtained with post-processing techniques (and perhaps better than can be obtained with conventional DGPS in which the error correction data is continuously broadcast with some latency, as in the U.S. Coast Guard and Acc-Q-Point systems).

Figure 7:
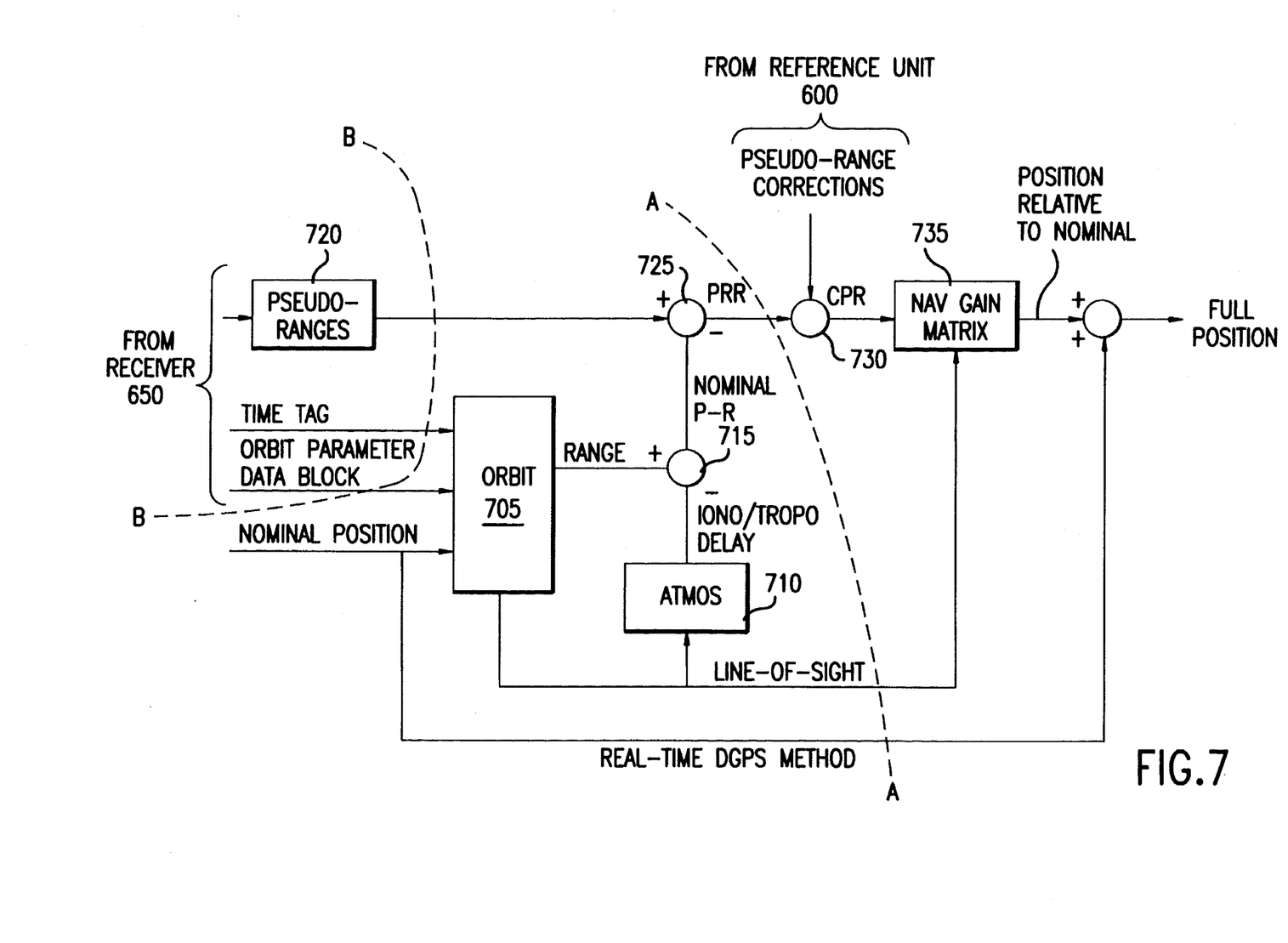
FIG. 7 shows a real-time DGPS method.

Any of several known methods can be employed at the rover for determining a corrected position using known DGPS computation methods. FIG. 7 shows an example of a realtime DGPS computation method in which GPS receiver 650 supplies measurement data, a time tag and an orbit parameter data block to processor 655. The orbit parameter data block is updated in realtime by the GPS satellites. A nonfinal position of GPS antenna 645 is known, for example, from previous corrected or uncorrected fixes or can be an estimated position entered by the user. Using the time tag, the orbit parameter data block and the nominal position, an Orbit routine 705 computes range data and line-of-sight vectors. The line-of sight vectors are supplied to an Atmospheric routine 710 which calculates ionospheric and tropospheric propagation delays. The computed range is corrected for the computed propagation delays at 715 to produce a nominal pseudo-range (Nominal P-R). Using the measurement data from receiver 650, a Pseudo-Ranges routine 720 computes pseudo-ranges. At 725, the nominal pseudo-ranges are subtracted from the pseudo-ranges to produce a set of pseudo-range residuals (PRR) relative to nominal position. These pseudo-range residuals are combined at 730 with pseudo-range corrections received, for example, from reference unit 600, to produce corrected pseudo-range residuals (CPR) relative to nominal position. A Nav Gain Matrix routine 735 computes a navigation gain matrix from the line-of-sight vectors and applies the matrix to the corrected pseudo-range residuals (in an operation also known as "least squares") to produce a position relative to nominal position. The position relative to nominal position is combined with the nominal position to produce a "full position" corrected to DGPS accuracy.

The realtime DGPS computation method of FIG. 7 can be carried out in rover 640 in at least two ways. In a first way, processor 655 performs the operations to the left of dashed line A—A to compute the pseudo-range residuals (PRR) and the line-of-sight vectors, and stores these (e.g., in memory 660) with the navigation gain matrix and the time tag (or other request ID) and the nominal position to await receipt of pseudo-range corrections. The rover transmits a demand for pseudo-range corrections valid at the time of the time tag. When the pseudo-range corrections are received from reference unit 600, processor 655 resumes the corrected-fix computation by completing the operations to the right of dashed line A—A. In this approach, a "coarse" time tag (to within one second as the position corrections change at only about ½m/sec) and a "coarse" nominal position (to within 100 km) are sufficient.

Alternatively, processor 655 performs the operations to the left of dashed line B—B by computing the pseudo-ranges. These are stored (e.g., in memory 660) along with the time tag, the orbit parameter data block and the nominal position to await receipt of pseudo-range corrections. The rover transmits a demand for pseudo-range corrections valid at the time of the time tag. When the pseudo-range corrections are received from reference unit 600, processor 655 resumes the corrected-fix computation by completing the operations to the right of dashed line B—B. In this approach, the rover must store a very precise time tag (to within less than one millisecond) because the pseudo-ranges change by some 800 m/sec. However, the rover's demand message need only include a "coarse" time tag and a "coarse" nominal position.

Figure 8:
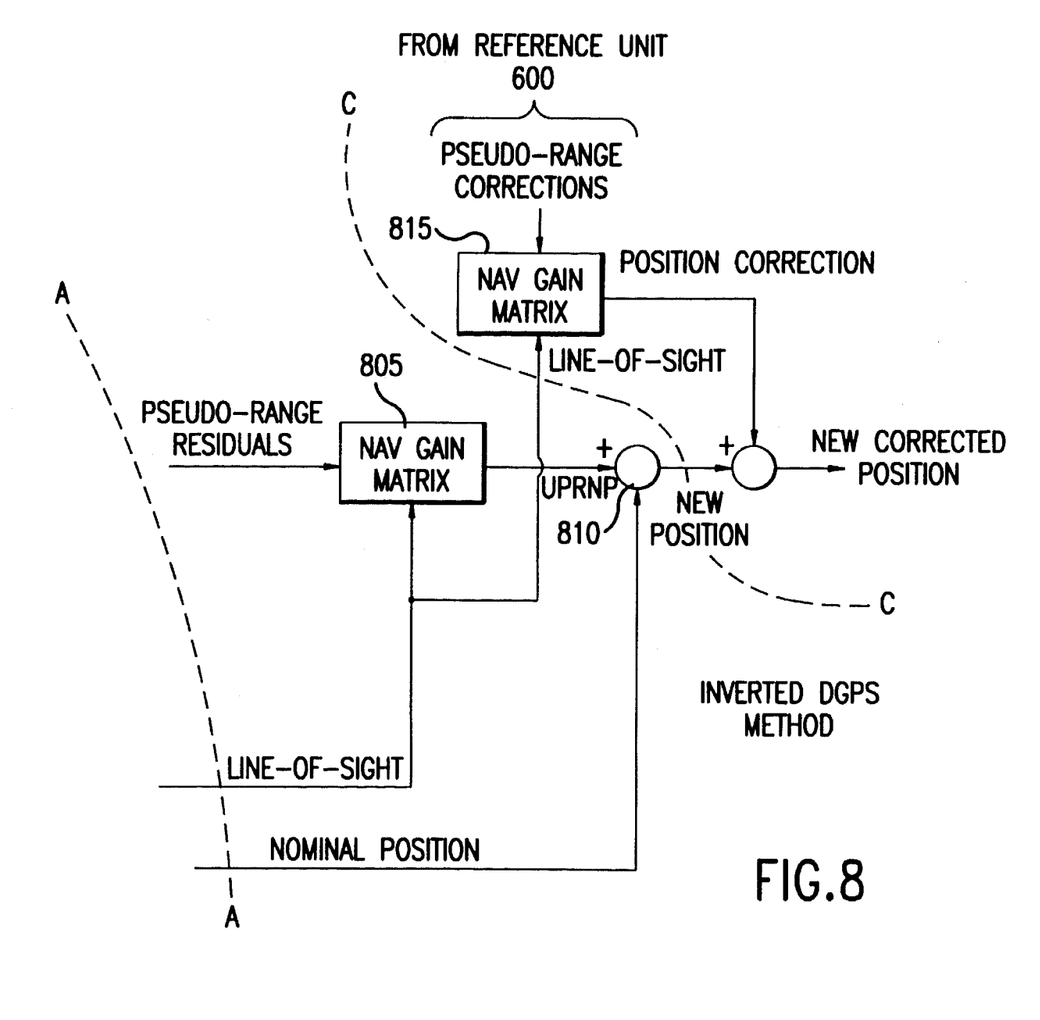
FIG. 8 shows an inverted DGPS method.

FIG. 8 shows an "inverted" DGPS computation method. In this approach, the pseudo-range residuals (PRR), and the line-of-sight vectors are computed as shown to the left of dashed line A—A in FIG. 7. The corrected pseudo-range residuals and line-of-sight vectors are supplied to a Nav Gain Matrix routine 805 to produce an uncorrected position relative to nominal position (UPRNP). The uncorrected position relative to nominal position is combined at 810 with the nominal position to produce a "new position" not yet corrected to DGPS accuracy. The line-of-sight vectors and the pseudo-range corrections are supplied to a Nav Gain Matrix routine 815 (identical to Nav Gain Matrix routine 805) to produce a position correction. The position correction and the "new position" are Combined at 820 to produce a "new corrected position."

The realtime DGPS computation method of FIG. 8 can be carried out in rover 640 in at least two ways. In a first way, processor 655 performs the operations to the left of dashed line A—A to compute the pseudo-range residuals (PRR) and the line-of-sight vectors, and stores these (e.g., in memory 660) with the time tag and the nominal position to await receipt of pseudo-range corrections. The rover transmits a demand for pseudo-range corrections valid at the time of the time tag. When the pseudo-range corrections are received from reference unit 600, processor 655 resumes the corrected-fix computation by completing the operations to the right of dashed line A—A in FIG. 8.

Alternatively, processor 655 performs the operations to the left of dashed line C—C by computing the line of sight vectors and the "new position." These are stored (e.g., in memory 660) along with the time tag and the navigation gain matrix to await receipt of pseudo-range corrections. The rover transmits a demand for pseudo-range corrections valid at the time of the time tag. When the pseudo-range corrections are received from reference unit 600, processor 655 resumes the corrected-fix computation by completing the operations to the right of dashed line C—C in FIG. 8. In this approach, the rover need only include a "coarse" time tag and a "coarse" nominal position in its demand message.

With any of the approaches outlined above, the rover can optionally include a list of satellites for which p-r corrections are needed, to reduce the size of the return message. Reference unit 600 returns p-r corrections valid at the time of the time tag for all satellites or for only those satellites identified in the rover's demand message.

In contrast to the post-processing DGPS systems such as used by surveyors (e.g. TRIMVEC™ and PATHFINDER™ systems from Trimble Navigation Limited), the portable rover unit of the present invention can be used, for example, for tagging an article or location with or without a precise time stamp and/or identifying data (such as an asset identification number). The antenna is placed at the desired location and a "fix" request is made by the operator. In response to this request, the rover unit begins computation of a position fix, stores the necessary fix data (along with any other data of interest such as an instrument reading or identification of an article tagged), and transmits a demand for p-r correction data applicable to the time of the fix. Within minutes, the rover receives the error correction data, retrieves the stored fix data, and finishes computing corrected time and position fix. As the corrected time and position fix is available at the rover, the rover knows it has good data before leaving (or at least before traveling far from) the tagged location. This is in contrast to conventional post-processing DGPS where the rover only knows with DGPS accuracy where it has been after it has returned to home base.

The invention is useful for precise deployment of equipment, particularly where one wishes to deploy an instrument or device or sensor with great precision in a remote location. Of course, if the deployment is made with optimum DGPS accuracy, it will be easier to locate again at a later date.

The invention is also useful for tagging the location and time of field strength measurements of transmitted radio signals. For example, cellular telephone service providers wish to make precise signal strength measurements at the fringes of their service areas where a cellular telephone link for transmission of error correction data may be unavailable or intermittent.

Following is a further preferred operating protocol in accordance with the invention in which the rover unit need not transmit a time tag:

1. The operator of the rover unit first connects the unit to any optional external unit. The external unit may provide a data input to be included with the time and location tag or may receive a data output of the time- and-location tag. The optional external unit can be a measuring instrument or bar-code reader or portable computer, for example.
2. The operator of the rover unit attaches the GPS antenna of the rover unit to an article or location to be tagged.
3. The operator initiates the tagging transaction sequence.
4. The rover unit sends a "demand differential correction" message to the reference unit and resets its memorization function. The rover unit appends a recent "uncorrected" GPS position fix to the "demand differential correction" message so that the reference unit can supply error-correction data appropriate to the rover's location.
5. The rover unit records GPS fix data since the last reset of the memorization function. It also monitors whether its antenna location has moved since the last reset, based on the GPS measurement of velocity and (optionally) external inputs from speed sensors, and resets the memorization process as necessary.
6. The reference unit receives the demand for differential correction and immediately sends the appropriate differential GPS correction message to the requesting unit, along with a corresponding time tag.
7. The rover unit receives the differential correction message front the base unit, reads the time tag, searches through its memory of stored fix data, selects the fix data appropriate for the valid time of the error-correction data, and computes a differentially-corrected fix. If the time of the differential correction message does not correspond exactly to the time at which a valid measurement was taken by the rover, the rover can elect to use the error-correction data (if it is within an acceptable latency) or to send another demand for error-correction data.
8. The rover unit completes the transaction by (a) sending the corrected fix data to the reference unit for archiving or re-distribution, (b) recording the corrected fix data in its own memory and/or (c) passing the corrected fix data to the attached external device.

The system exploits the ubiquitous nature of the Orbcomm satellite communication link, but compensates for one of its major shortcomings—transport delay. It also marries well with the type of application that is targeted economically by the Orbcomm link: very occasional, short-duration, high-value, data-only messages. The system of the present invention preferably uses a packetized coded-data message format to further exploit the economies of such a satellite data link.

Possible applications of the invention include:

Asset Management. A customer assigns an asset code to each piece of equipment, and uses the system to locate it all and create data for asset management, inventory management, logistics and asset tracking systems.

Facilities Mapping. A customer collects location data for elements of a physical plant.

Remote Sensing. A customer uses the system to precisely locate where portable or remote sensors are located when a measurement is made, field strength measurement, dam deformation, etc.

Precise Deployment. A customer uses the system to precisely deploy an asset at a selected location. In this case, it is the rover unit and not the base unit that needs the precise location information. An example of this is the precise deployment of sensors or other equipment.

Those of skill in the art in possession of the foregoing description will recognize that many modifications may be made within the spirit and scope of the present invention as defined in the following claims. For example, while FIG. 6 shows for simplicity of illustration a local-area DGPS system having a single reference receiver, the error-correction data supplied to the rover can just as well be derived from a network of reference stations forming a wide-area DGPS system. If the error-correction data is derived from a wide-area DGPS network, it can be geographically interpolated in known fashion to provide error-correction appropriate for the nominal position of the rover.

We claim:

1. A method for obtaining optimally error-corrected GPS position and time fixes in near real-time at a remote rover unit, comprising the steps of:

a. positioning the rover unit at a selected location and, at the rover unit, receiving GPS signals, storing uncorrected data from which a GPS fix can be computed, and transmitting a demand for error-correction data over a communication link having a two-way communication latency unacceptable for realtime communication of DGPS error-correction data;

b. at a known location remote from the rover, receiving GPS signals, computing error-correction data and storing a sequence of error-correction data for a plurality of times, receiving the demand for error correction data, retrieving error-correction data from storage, and transmitting error-correction data over the communication link to the rover unit;

c. at the rover unit, receiving the transmitted error-correction data, and computing a differentially-corrected fix using the received error correction data and the stored uncorrected data.

2. The method of claim 1, wherein transmitting a demand for error-correction data comprises transmitting a message containing a time stamp indicating a time for which valid error-correction data is desired.

3. The method of claim 2, wherein said message further contains an indication of nominal position of the rover unit.

4. The method of claim 2, wherein transmitting error-correction data comprises transmitting error-correction data valid at the time indicated by the time stamp.

5. The method of claim 3, wherein transmitting error-correction data comprises transmitting error-correction data valid at the time indicated by the time stamp and for a geographical region including the nominal position of the rover unit.

6. The method of claim 2, further comprising the step of interpolating from the error-correction data retrieved from storage a set of error-correction data valid at the time indicated by the time stamp.

7. The method of claim 2, further comprising the step of interpolating from the error-correction data retrieved from storage a set of error-correction data valid at the time indicated by the time stamp for a geographical region including the nominal position of the rover unit.

8. The method of claim 2, wherein step a further comprises the step of computing pseudo-range residuals relative to nominal position and line-of-sight vectors and wherein storing uncorrected data comprises storing the pseudo-range residuals and line-of-sight vectors and the nominal position and the time tag.

9. The method of claim 2, wherein step a further comprises the step of computing pseudo-range residuals relative to nominal position and a navigation gain matrix and wherein storing uncorrected data comprises storing the pseudo-range residuals and navigation gain matrix and the nominal position and the time tag.

10. The method of claim 2, wherein step a further comprises the step of computing pseudo-ranges and wherein storing uncorrected data comprises storing the pseudo-ranges and a set of orbit parameter data and the nominal position and the time tag.

11. The method of claim 2, wherein step a further comprises the step of computing an uncorrected position solution and a navigation gain matrix, and wherein storing uncorrected data comprises storing the uncorrected position solution and the navigation gain matrix and the time tag.

12. Apparatus for obtaining optimally error-corrected GPS position and time fixes in near real-time at a rover unit remote from a reference unit, comprising:

a. a rover unit comprising:
  i. a GPS receiver for receiving GPS signals,
  ii. a processor with associated memory for storing uncorrected data from which a GPS fix can be computed and for computing a differentially-corrected fix using error-correction data and the stored uncorrected data, and
  iii. a rover-unit transceiver for transmitting a demand for error-correction data over a communication link having a two-way communication latency unacceptable for realtime communication of DGPS error-correction data and for receiving error-correction data over the communication link; and b. a reference unit comprising:
  i. a GPS receiver for receiving GPS signals,
  ii. a processor with associated memory for computing error-correction data and storing a sequence of error-correction data for a plurality of times and retrieving error-correction data from storage in response to a demand for error-correction data, and
  iii. a reference-unit transceiver for receiving the demand for error correction data and transmitting error-correction data retrieved from storage to the rover unit over the communication link.

13. The apparatus of claim 12, wherein said demand for error-correction data comprises a time stamp indicating a time for which valid error-correction data is to be supplied by the reference unit.

14. The apparatus of method of claim 13, wherein said demand for error-correction data further comprises an indication of nominal position of the rover unit.

15. The apparatus of claim 13, wherein said reference unit is responsive to the demand for error-correction data for transmitting error-correction data valid at the time indicated by the time stamp.

16. The apparatus of claim 14, wherein said reference unit is responsive to the demand for error-correction data fix transmitting error-correction data valid at the time indicated by the time stamp and for a geographical region including the nominal position of the rover unit.

17. The apparatus of claim 13, wherein the processor of the reference unit is responsive to the demand for error-correction data for interpolating from stored error-correction data a set of error-correction data valid at the time indicated by the time stamp.

18. The apparatus of claim 13, wherein the processor of the rover unit is responsive to signals from the GPS receiver of the rover unit for computing pseudo-range residuals relative to nominal position and line-of-sight vectors, and for storing the pseudo-range residuals and line-of-sight vectors and the nominal position and the time tag, and wherein the processor of the rover unit is further responsive to error-correction data received from the reference unit for computing a differentially-corrected position fix.

19. The apparatus of claim 13, wherein the processor of the rover unit is responsive to signals from the GPS receiver of the rover unit for computing pseudo-range residuals relative to nominal position and a navigation gain matrix and for storing the pseudo-range residuals and navigation gain matrix and the nominal position and the time tag, and wherein the processor of the rover unit is further responsive to error-correction data received from the reference unit for computing a differentially-corrected position fix.

20. The apparatus of claim 13, wherein the processor of the rover unit is responsive to signals from the GPS receiver of the rover unit for computing pseudo-ranges and for storing the pseudo-ranges and a set of orbit parameter data and the nominal position and the time tag, and wherein the processor of the rover unit is further responsive to error-correction data received from the reference unit for computing a differentially-corrected position fix.

21. The apparatus of claim 13, wherein the processor of the rover unit is responsive to signals from the GPS receiver of the rover unit for computing an uncorrected position solution and a navigation gain matrix, and for storing the uncorrected position solution and the navigation gain matrix and the time tag, and wherein the processor of the rover unit is further responsive to error-correction data received from the reference unit for computing a differentially-corrected position fix.

* * * * *